United States Patent [19]

Simon et al.

[11] Patent Number: 4,907,407

[45] Date of Patent: Mar. 13, 1990

[54] LIFETIME ARCJET THRUSTER

[75] Inventors: Mark A. Simon, Redmond; Steve Knowles; William Smith, both of Seattle, all of Wash.

[73] Assignee: Olin Corporation, Stamford, Conn.

[21] Appl. No.: 154,405

[22] Filed: Feb. 10, 1988

[51] Int. Cl.[4] ............ F03H 1/00

[52] U.S. Cl. ............ 60/203.1; 219/121.51; 313/231.51

[58] Field of Search ............ 60/203.1; 313/231.41, 313/231.51; 219/121.48, 121.5, 121.51, 121.52, 121.55

[56] References Cited

U.S. PATENT DOCUMENTS

| | | | |
|---|---|---|---|
| 3,309,873 | 3/1967 | Cann | 60/203.1 |
| 3,456,146 | 7/1969 | Hess | 313/231.41 |
| 4,304,980 | 12/1981 | Fridlyand et al. | 219/121.52 |
| 4,506,136 | 3/1985 | Smyth et al. | 313/231.51 |
| 4,548,033 | 10/1985 | Cann . | |
| 4,800,716 | 1/1989 | Smith et al. | 60/203.1 |
| 4,805,400 | 2/1989 | Knowles | 60/203.1 |

FOREIGN PATENT DOCUMENTS

| | | | |
|---|---|---|---|
| 2510210 | 9/1976 | Fed. Rep. of Germany | 313/231.41 |
| 1368255 | 6/1964 | France | 60/203.1 |
| 145468 | 7/1985 | Japan | 60/203.1 |

OTHER PUBLICATIONS

Arc-Jet Thrustor for Space Propulsion, Lewis E. Wallner and Joseph Czika, Jr. 1965.

Physics of Electric Propulsion, Robert G. John, McGraw-Hill Book Co., 1968, pp. 89-93, 118-131.

The Arc Heated Thermal Jet Engine, Friedrich G. Penzig, Mar. 1968.

*Primary Examiner*—Donald E. Stout

*Attorney, Agent, or Firm*—Bruce E. Burdick

[57] ABSTRACT

An arcjet thruster has an anode body forming a constrictor and a nozzle which define an arc chamber. The thruster also has a cathode in the form of a rod having a tip and being spaced upstream from the constrictor. The thruster employs several features which reduce anode and cathode erosion and increase the operational life of the thruster. One set of features relate to the employment of cathode and anode shaping. Another feature relates to the use of a propellant injector having a series of radially and tangentially arranged passages for providing direct injection of propellant gas into the arc chamber and enhanced convective cooling of the anode.

27 Claims, 1 Drawing Sheet

LIFETIME ARCJET THRUSTER

CROSS REFERENCE TO RELATED APPLICATIONS

Reference is hereby made to the following copending U.S. patent applications dealing with related subject matter and assigned to the assignee of the present invention:

1. "Improved Efficiency Arcjet Thruster with Controlled Arc Startup and Steady State Attachment" by S. C. Knowels and W. W. Smith, assigned U.S. Ser. No. 06/889,451 and filed 07/23/86, now U.S. Pat. No. 4,800,716 issued 01/31/89.

2. "Arcjet Thruster with Improved Arc Attachment for Enhancement of Efficiency" by W. W. Smith and S. C. Knowles, assigned U.S. Ser. No. 103,471 and filed 10/01/87.

3. "Improved Performance Arcjet Thruster" by S. C. Knowles and W. W. Smith, assigned U.S. Ser. No. 150,591 and filed 02/01/88.

BACKGROUND OF THE INVENTION

Field of the Invention

The present invention generally relates to small propulsion systems for maneuvering spacecraft and, more particularly, is concerned with an electothermal arcjet thruster employing any one of several features for increased operational life.

Description of the Prior Art

As conventionally known, an electrothermal arcjet thruster converts electrical energy to thermal energy by heat transfer from an arc discharge to a flowing propellant and from thermal energy to directed kinetic energy by expansion of the heated propellant through a nozzle. For an explanation from an historical perspective of arcjet thruster construction and operation and the problems associated with this type of electrothermal propulsion, attention is directed to the following publications: "Arcjet Thruster for Space Propulsion" by L. E. Wallner and J. Czika, Jr., NASA Tech Note D-2868, June 1965; "The Arc Heated Thermal Jet Engine" by F. G. Penzig, AD 671501, Hollomen Air Force Base, March 1966; and "Physics of Electric Propulsion" by R. G. Jahn, McGraw-Hill Book Company, 1968, specifically pages 90–93 and 118–133. Attention is also directed to U.S. Pat. No. 4,548,033 to G. L. Cann.

Most electrothermal arcjet thrusters have as common features an anode in the form of a nozzle body and a cathode in the form of a cylindrical rod with a conical tip. The nozzle body has an arc chamber defined by a constrictor in a rearward portion of the body and a nozzle in a forward portion thereof. The cathode rod is aligned on the longitudinal axis of the nozzle body with its conical tip extending into the upstream end of the arc chamber in spaced relation to the constrictor so as to defined a gap therebetween.

An electric arc is first initiated between the cathode rod and the anode nozzle body at the entrance to the constrictor. The arc is then forced downstream through the constrictor by pressurized vortex-like flow of a propellant gas introduced into the arc chamber about the cathode rod. The arc stabilizes and attaches at the nozzle. The propellant gas is heated in the region of the constrictor and in the region of arc diffusion at the mouth of the nozzle downstream of the exit from the constrictor. The super heated gas is then exhausted out the nozzle to achieve thrust.

During operation of all arcjet thrusters, electrodes, i.e., the anode and cathode, incur, to some degree, material loss or erosion. Erosion occurs during the initial start-up transient and also during steady state operation. For as long as arcjet thrusters have been under investigation and development, electrode erosion has been a determinate factor of arcjet thruster lifetime. It would be highly desirable to be able to reduce the occurrence of erosion in order to increase the operational life of arcject thrusters.

SUMMARY OF THE INVENTION

The present invention provides an improved lifetime arcjet thruster designed to satisfy the aforementioned needs. Underlying the present invention is the perception that the operational life of an arcjet thruster can be increased and enhanced by improved cathode shaping, anode shaping, and propellant injection technique. The present invention encompasses several different features, being unknown in the prior art, which minimize anode and cathode erosion, provide direct injection of propellant into the arc region, and employ anode convective cooling in conjunction with the injection technique. Most of the features are advantageously incorporated together in the same arcjet thruster to realize significantly improved lifetime, efficiency and performance, although in certain instances the advantages to be derived from some of the features can be enjoyed separately from the others in different thrusters.

Basically, each of the features provide enhancement of arcjet thruster performance, efficiency and/or useful lifetime. One feature relates to the use of anode shaping to minimize anode erosion during arcjet thruster operation. Through predetermined shaping of the anode, the sonic point of the thruster can be forced to locate at the sharpest edge on the anode downstream of the cathode which edge defines the nozzle throat. Large gas dynamic arc resistance is thus established at the nozzle throat, shielding the edge from destructive erosion-inducing arc attachment. Attachment of the arc is forced downstream past the throat and into the expansive portion of the nozzle of the anode. Attachment in this low pressure region is diffuse and non-erosive.

Another feature relates to pre-conditioning the shape of the cathode rod tip prior to installation of the cathode in an operational arcjet thruster. The pre-conditioned tip shape is the one the tip would assume after being used in the arcjet thruster environment. The cathode tip is pre-conditioned by being machined to the desired shape in which the cathode tip has optimal erosion resistance.

Still another feature relates to a propellant injection technique which provide maximum anode life through provision of (1) a maximum radial pressure gradient via direct injection of a vortex flow into the arc region and (2) a plurality of injector propellant passages wherein propellant in constant contact with the anode convectively cool the anode prior to entering the arc region. The pressure gradient induces the arc to pass down the thruster central axis past the throat of the nozzle. The lower temperature of the anode reduces the anode erosion rate.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Standard Prior Art Arcjet Thruster

Figure 1:
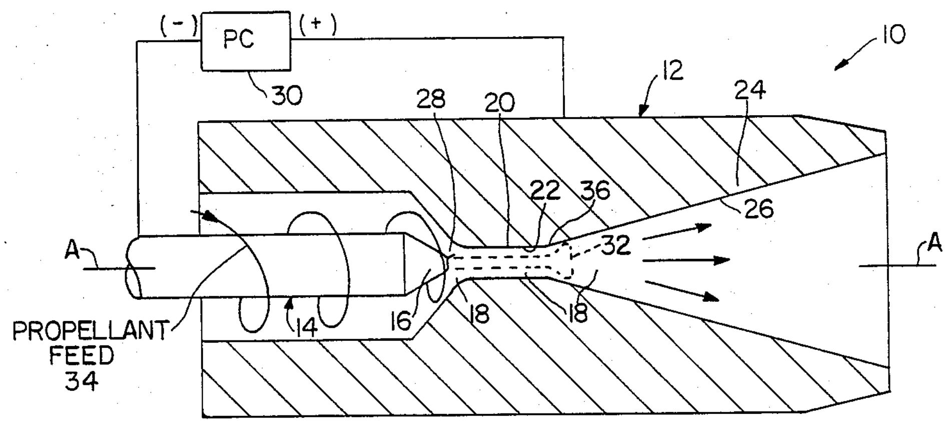
FIG. 1 is a schematical axial sectional view of the cathode rod and anode nozzle body of a standard prior art arcjet thruster.

Referring now to the drawings, and particularly to FIG. 1, there is shown in schematical fragmentary form a standard constricted arc geometry electrothermal arcjet thruster of the prior art, generally indicated by the numeral 10. As conventionally known, the arcjet thruster 10 basically includes an anode 12 in the form of a cylindrical body composed of electrically-conductive metal and a cathode 14 in the form of an elongated cylindrical rod composed of electrically-conductive metal with a conical tip 16. The anode body 12 has an arc chamber 18 defined by a constrictor 20 in the form of a cylindrical surface 22 in a rearward portion of the body and a nozzle 24 in the form of a conical surface 26 in a forward portion thereof. The cathode rod 14 is aligned on the longitudinal axis A of the anode body 12 with its tip 16 extending into the upstream end of the arc chamber 18 in spaced relation to the constrictor 20 so as to defined a gap 28 therebetween.

A power controller 30 is electrically connected between the anode body 12 and the cathode rod 14 and is operable in a known manner for establishing an electrical potential therebetween, being positive at the anode body 12 and negative at the cathode rod 14, to initiate generation of an arc 32 across the gap 28. The power controller 30 is represented in block form since its components are well known in the art, and to reproduce them in detail would only serve to increase the complexity of the explanation of the arcjet thruster 10 without adding to its clarity.

The arc 32 is first initiated between the tip 16 of the cathode rod 14 and the anode body 12 at the entrance to the constrictor 20. If the thruster 10 performs up to design standards, the arc 32 is then forced downstream along the surface 22 of the constrictor 20 by pressurized vortex-like flow of a propellant gas, as represented by the arrow 34, through and past the gap 28, through the constrictor 20 and out the nozzle 24 of the thruster 10. The arc 32 stabilizes at the surface 26 of the nozzle 24 of the anode body 12.

In the above-described standard constricted arc geometry arcjet thruster 10, the electric arc 32 is "constricted" by the parallel electrode geometry of the constrictor cylindrical surface 22 and by the radial gas dynamic forces of the induced vortex generated by tangential injection of the propellant from the upstream end of the anode body 12 along and past the cathode rod 14. The propellant gas is heated in the region of the constrictor 20 and in the region of arc diffusion at the mouth 36 of the nozzle 24 downstream of the exit from the constrictor. This superheated gas is then exhausted out the nozzle 24 to achieve thrust. The electrical circuit of the arcjet thruster 10 is completed between the cathode rod 14 and anode body 12 with arc attachment occurring in the region of the nozzle mouth 36. The location of arc attachment in the anode body 12 is determined by the mass flow rate, which "pushes" the arc diffusion region down the nozzle 24, and by the availability of an electrically conductive region, i.e. the anode body, for arc attachment.

Shortcoming of Standard Prior Art Arcjet Thruster

However, the prior art arcjet thruster 10 frequently fails to perform up to design standards. Suboptimal performance and decreased operational lifetime are typically experienced, being attributed, in part, to one major occurrence, erosion of the anode and cathode. Erosion occurs during initial start-up transient and also during steady state operation. The features of the present invention which will now be described relate directly to modifications which reduce erosion to the anode and cathode and thereby significantly increase the operational lifetime of the arcject thruster.

Anode Shaping

Figure 2:
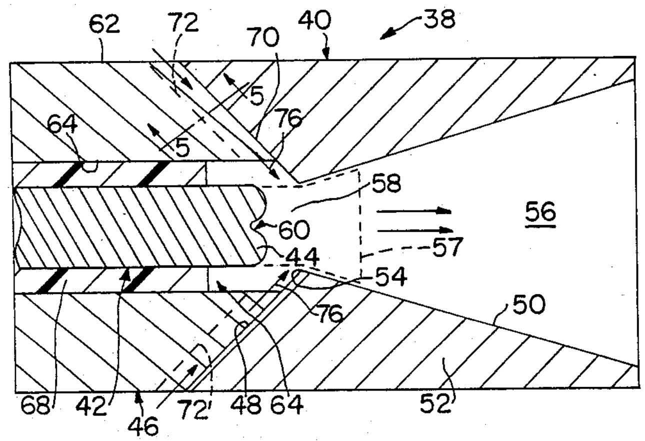
FIG. 2 is a schematical axial sectional view of an improved lifetime arcjet thruster having the features of the present invention.

Turning now to FIG. 2, there is illustrated an improved lifetime arcjet thruster, generally designated by the numeral 38 and incorporating the features of the present invention. In its basic components, the improved lifetime thruster 38 includes an electrically-conductive annular-shaped anode body 40, an electrically-conductive cylindrical cathode rod 42 having an end tip 44, means for applying an electrical potential to the anode body 40 and cathode rod 42 (which is not shown in FIG. 2 since it is substantially identical to the power controller 30 of FIG. 1), and means 46 for supplying a flowing propellant gas.

The first feature of the present invention is directed to anode erosion reduction through shaping of the anode body 40. In particular, the anode body 40 has oppositely-tapered upstream and downstream interior continuous conical surfaces 48, 50. The downstream interior conical surface 50 defines a nozzle 52 having an upstream throat region constituted by a sharp annular edge 54 and, tandemly-arranged therewith and extending therefrom, a downstream expansion region 56. The throat and expansion regions 54, 56 of the nozzle 52 together define an arc chamber having a generally nonparallel supersonic configuration in view that the sonic point of the thruster 38 is located at the merger of the upstream and downstream interior conical surfaces 48, 50, which is the minimum diameter location defining the throat region 54 of the nozzle 52.

When the electrical potential is applied to the anode body 40 and the cathode rod 42, an electrical arc 57 is generated in the arc chamber which extends from the cathode rod tip 44 to the anode body 40 which, due to location of the nozzle throat region 54 and the supersonic configuration of the nozzle 52, attaches to the anode body 40 at a location downstream of the nozzle throat region 54. It will be observed that in shaping the anode body 40 in order to reduce erosion thereof, the constrictor of the prior art thruster 10 has essentially now been eliminated in the improved lifetime arcjet thruster 38.

The unique feature of the new anode body shape shown in FIG. 2 is the location of the sonic point in relation to where the sharpest edge, downstream of the cathode tip 44, is located. By forcing the sonic point to be located at the anode throat edge 54, a large gas dynamic arc resistance is established, shielding this edge from arc attachment. Testing conducted at the assignee's facility has shown that if the edge was exposed between the sonic point and the cathode, destructive arc attachment at the edge was likely. Large amounts of material loss would occur. The anode shape shown in FIG. 2 forces the arc 57 to attach past the throat region or sharp edge 54 in the expansion region 56 of the anode body nozzle 52, as represented by the dotted outline of the arc. Attachment in this low pressure region is diffuse and non-erosive. Testing has verified this attribute of the anode shape shown in FIG. 2.

Cathode Shaping

Figure 4:
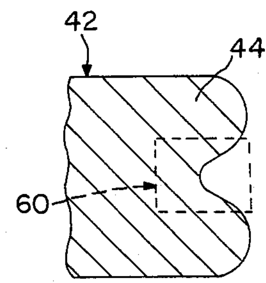
FIG. 4 is an enlarged fragmentary view of the tip of a cathode rod employed in the improved lifetime arcjet thruster in accordance with another feature of the present invention.

The second feature of the present invention addresses shaping of the cathode rod tip to reduce cathode erosion. The end tip 44 of the cathode rod 42 is axially disposed adjacent to the upstream interior conical surface 48 of the anode body 40 and spaced axially upstream from the nozzle throat region 54 by a gap 58. More particularly, as shown in FIGS. 2 and 4, the end tip 44 of the cathode rod 42 has an indented region, generally designated 60, within which steady state attachment of the electric arc 57 resides so as to reduce erosion of the cathode tip 44. More specifically, the indented region 60 in tip 44 of the cathode rod 42 is in the form of a central concave depression.

The uniqueness of shaping of the cathode rod 42 is the pre-conditioning or pre-machining of its tip 44 prior to installation in the thruster 38. By pre-conditioning the cathode, the erosion phenomena which occur on a new cathode are eliminated during actual operation. The initial erosion which takes place in absence of pre-conditioning occurs at a much higher rate than that which occurs after conditioning or machining the cathode. Testing at assignee's facilities has shown the above to be true. Machining of the cathode involves forming it to the shape described above being similar to that caused by erosion without pre-conditioning.

The shape of FIG. 4 offers optimal resistance against convective mass loss, evaporative mass loss and mass loss due to sputtering. This cathode geometry has tested effective in minimizing mass loss. During arcjet operation, the arc attachment resides in the indented region 60 of the cathode tip 44. By doing so the high temperature, molten portion of the cathode is shielded from convective mass loss. The indented region becomes a high temperature cavity due to reradiation. As a result, increased thermionic emission occurs. Thus, for a given current value the area necessary to supply electrons is reduced. It is currently thought that this area reduction, in conjunction with an increased ionic recombination rate, reduces the evaporative and sputtering mass loss rate.

Propellant Injection in Cathode Tip and Nozzle Throat Regions

The third feature of the present invention relates to propellant gas injection directly into the arc chamber at the regions of the cathode tip 44 and nozzle throat 54. The propellant gas supplying means 46, shown in FIG. 2 and in greater detail in FIGS. 3 and 5, supplies flowing propellant gas directly into arc chamber through the nozzle throat region 54 concurrently with the generation of the electric arc 57 so as to produce thermal heating of the flowing gas in the arc chamber and expansion thereof through the nozzle expansion region 56. The means 46 is arranged such that the gas is supplied directly into the arc chamber without first passing along the length of the cathode rod 42, as was the case in the prior art thruster 10.

More particularly, the flowing propellant gas supplying means 46 is an annular-shaped injector body 62 disposed contiguous with an upstream end of the anode body 40 and having a central bore 64. The bore 64 communicates with the throat region 54 of the nozzle 52 and receives therewithin the cathode rod 42 which extends in spaced relation to the interior cylindrical surface 66 of the injector body 62 defining the bore 64. Also, an electrically-insulative sleeve 68 is disposed in the central bore 64 of the injector body 62 between the cathode rod 42 and the interior surface 66 of the injector body. The sleeve 68 extends along the length of the cathode rod 42, but terminates short of the tip 44 thereof.

Figure 5:
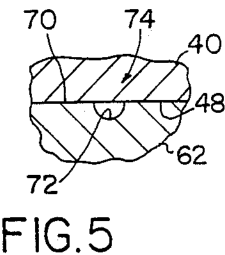
FIG. 5 is an enlarged fragmentary sectional view taken along line 5—5 of FIG. 2.
Figure 3:
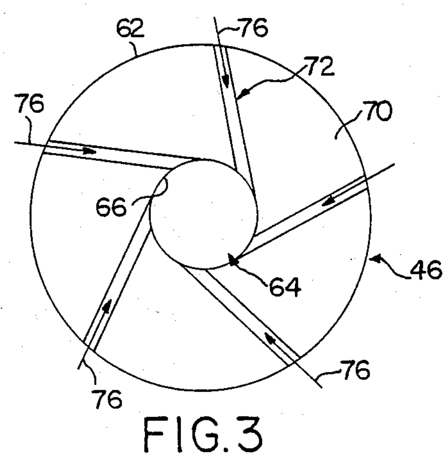
FIG. 3 is a front end view of a propellant injector employed in conjunction with the anode of the improved lifetime arcjet thruster in accordance with one feature of the present invention.

As seen in FIGS. 2, 3 and 5, the injector body 62 has a conical surface 70 on its downstream end which matches and makes flush contact with the upstream conical surface 48 on the anode body 40. The injector body 62 has a series of grooves 72, semi-cylindrical in cross-section, formed in its downstream surface 70. The grooves 72 extend radially and tangentially to the throat region 54 of the nozzle 52 such that together with the upstream surface 48 of the anode body, they form a series of passages 74 which also extend radially and tangentially to nozzle throat region 54. The flowing propellant gas is supplied in a vortex flow in the direction of the arrows 76 to the throat region 54 and directly into the arc chamber within the anode body nozzle 52. As the propellant gas is supplied through the series of passages 74, the gas flows in contact with the anode body 40 to provide convective cooling thereof.

The vortex flow introducted directly into the arc chamber maximizes the radial pressure gradient. The pressure gradient induces the arc 57 to pass down the center of the nozzle 52 past the throat region 54. Testing has shown that should the arc reside upstream of the throat region, anode material loss results.

Another unique aspect of this propellant injection techique is the particular path in which the propellant gas travels as it transits to the arc chamber. From the time the propellant gas enters the injector body 62, to the time it leaves the arcjet thruster 38, it is in constant contact with the anode body 40. This provides convective cooling. The resulting lower anode temperature, in turn, reduces the anode erosion rate.

It should now be readily apparent how all of the above-described features of the present invention work to reduce anode and cathode erosion and contribute to increased thruster lifetime.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

We claim:

1. In an arcjet thruster, the combination comprising:

(a) an electrically-conductive anode body having oppositely-tapered upstream and downstream interior conical surfaces about a common axis, said downstream interior conical surface defining a nozzle having tandemly-arranged upstream throat and downstream expansion regions which together define an arc chamber of generally nonparallel supersonic configuration, said upstream and downstream interior conical surfaces merging at a location of minimum diameter which defines said upstream throat of said nozzle;

(b) an elongated electrically-conductive cathode member having a tip disposed adjacent to said upstream interior conical surface of said anode body and spaced upstream from said nozzle throat region by a gap;

(c) means for applying an electrical potential to said anode body and cathode member so as to generate an electrical arc in said arc chamber extending from said cathode member tip to said anode body which due to location of said nozzle throat region and supersonic configuration of said nozzle attaches to said anode body at a location downstream of said nozzle throat region; and (d) means for supplying a flowing propellant gas radially and tangentially into said arc chamber through said nozzle throat region at about sonic velocity concurrently with the generation of said arc so as to cause said arc to attach to said anode at a location downstream of said nozzle throat region and produce thermal heating of said flowing gas in said chamber and expansion thereof through said nozzle expansion region.

2. The arcjet thruster as recited in claim 1, wherein said tip of said cathode member has an indented region within which steady state attachment of said arc resides so as to reduce erosion of said cathode tip.

3. The arcjet thruster as recited in claim 1, wherein said tip of said cathode has a central concave depression formed therein within which steady state attachment of said arc occurs so as to reduce erosion of said cathode tip.

4. The arcjet thruster as recited in claim 1, wherein said flowing propellant gas supplying means supplies gas directly into said arc chamber through said nozzle throat region without first passing said flowing gas along the length of said cathode member.

5. The arcjet thruster as recited in claim 1, wherein said flowing propellant gas supplying means is an injector body disposed contiguous with an upstream end of said anode body and having a central bore which communicates with said throat region of said nozzle and within which said cathode member extends in spaced relation to said injector body.

6. The arcjet thruster as recited in claim 5, further comprising:

(e) an electrically-insulative sleeve disposed in said central bore of said injector body between said cathode member and said injector body, and extending along the length of said cathode member but terminating short of said tip thereof.

7. The arcjet thruster as recited in claim 1, wherein said flowing propellant gas supplying means is an injector body disposed upstream of said anode body and defining a series of passages extending radially and tangentially to said throat region of said nozzle through which said propellant gas is supplied to said throat region.

8. The arcjet thruster as recited in claim 1, wherein said injector body has a conical surface on its downstream end which matches said upstream conical surface on said anode body.

9. The arcjet thruster as recited in claim 1, wherein said flowing propellant gas supplying means is an injector body disposed contiguous with said upstream interior surface of said anode body, said injector body having a series of grooves formed therein which together with said anode body define a series of passages extending radially and tangentially to said throat region of said nozzle through which said propellant gas is supplied in a vortex flow at said throat region and directly into said arc chamber.

10. The arcjet thruster as recited in claim 9, wherein as said propellant gas is supplied through said series of passages said gas flows in contact with said anode body to provide convective cooling thereof.

11. In an arcjet thruster, the combination comprising:

(a) an electrically-conductive anode body having an upstream end portion and a downstream portion, said anode body forming a nozzle having tandemly-arranged upstream throat and downstream expansion regions together defining an arc chamber, said throat region being a location of minimum diameter;

(b) an elongated electrically-conductive cathode member having a tip disposed adjacent to and spaced upstream from said throat region of said nozzle by a gap;

(c) means for applying an electrical potential to said anode body and cathode member so as to generate an electrical arc in said arc chamber extending from said cathode member tip to said anode body which in steady state attaches to said anode body at a location downstream of said nozzle throat region;

(d) said tip of said cathode member having an indented region within which steady state attachment of said arc resides so as to reduce erosion of said cathode tip; and (e) means for supplying a flowing propellant gas radially and tangentially into and through said nozzle throat region at about sonic velocity concurrently with the generation of said arc so as to produce thermal heating of said flowing gas in said chamber and expansion thereof through said nozzle expansion region, said gas having a subsonic velocity upstream of said throat region and a supersonic velocity in at least a portion of said expansion region.

12. The arcjet thruster as recited in claim 11, wherein said indented region of said cathode member is in the form of a central concave depression.

13. The arcjet thruster as recited in claim 11, wherein said flowing propellant gas supplying means includes an injector body disposed contiguous with an upstream end of said anode body and having a central bore which communicates with said throat region of said nozzle and within which said cathode member extends in spaced relation to said injector body.

14. The arcjet thruster as recited in claim 13, further comprising:

(f) an electrically-insulative sleeve disposed in said central bore of said injector body between said cathode member and said injector body, and extending along the length of said cathode member but terminating short of said tip thereof.

15. The arcjet thruster as recited in claim 11, wherein said flowing propellant gas supplying means is an injector body disposed upstream of said anode body and defining a series of passages extending radially and tangentially to said throat region of said nozzle through which said propellant gas is supplied to said throat region.

16. The arcjet thruster as recited in claim 15, wherein said injector body has a conical surface on its downstream end which matches a conical surface defined on an upstream end of said anode body.

17. The arcjet thruster as recited in claim 11, wherein said flowing propellant gas supplying means is an injector body disposed contiguous with the upstream portion of said anode body and having a series of grooves formed therein which together with said anode body define a series of passages extending radially and tangentially to said throat region of said nozzle through which said propellant gas is supplied in a vortex flow at said throat region and directly into said arc chamber.

18. The arcjet thruster as recited in claim 17, wherein as said propellant gas is supplied through said series of passages said gas flows in contact with said anode body to provide convective cooling thereof.

19. In an arcjet thruster, the combination comprising:

(a) an electrically-conductive anode body including a nozzle having tandemly-arranged upstream throat and downstream expansion regions and defining an arc chamber, said upstream throat region being a location of minimum diameter;

(b) an elongated electrically-conductive cathode member having a tip disposed adjacent to and spaced upstream from said throat region of said nozzle by a gap;

(c) means for applying an electrical potential to said anode body and cathode member so as to generate an electrical arc in said arc chamber extending from said cathode member tip to said anode body which in steady state attaches to said anode body at a location downstream of said nozzle throat region; and (d) means for supplying a flowing propellant gas directly into said arc chamber radially and tangentially into and through said nozzle throat region at about sonic velocity concurrently with the generation of said arc without first passing said flowing gas along the length of said cathode member so as to produce thermal heating of said flowing gas in said chamber and expansion thereof through said nozzle expansion region.

20. The arcjet thruster as recited in claim 19, wherein said tip of said cathode has an identified region within which steady state attachment of said arc resides so as to reduce erosion of said cathode tip.

21. The arcjet thruster as recited in claim 19, wherein said tip of said cathode has a central concave depression formed therein withing which steady state attachment of said arc occurs so as to reduce erosion of said cathode tip.

22. The arcjet thruster as recited in claim 19, wherein said flowing propellant gas supplying means is an injector body disposed contiguous with an upstream end of said anode body and having a central bore which communicates with said throat region of said nozzle and within which said cathode member extends in spaced relation to said injector body.

23. The arcjet thruster as recited in claim 22, further comprising (e) an electrically-insulative sleeve disposed in said central bore of said injector body between said cathode member and said injector body, and extending along the length of said cathode member but terminating short of said tip thereof.

24. The arcjet thruster as recited in claim 19, wherein said flowing propellant gas supplying means is an injector body disposed upstream of said anode body and defining a series of passages extending radially and tangentially to said throat region of said nozzle through which said propellant gas is supplied to said throat region.

25. The arcjet thruster as recited in claim 19, wherein said injector body has a conical surface on its downstream end which matches a conical surface on an upstream end of said anode body.

26. The arcjet thruster as recited in claim 19, wherein said flowing propellant gas supplying means is an injector body disposed contiguous with an upstream end of said anode body and having a series of grooves formed therein which together with said anode body define a series of passages extending radially and tangentially to said throat region of said nozzle through which said propellant gas is supplied in a vortex flow to said throat region and directly into said arc chamber.

27. The arcjet thruster as recited in claim 26, wherein as said propellant gas is supplied through said series of passages said gas flows in contact with said anode body to provide convective cooling thereof.

* * * * *